United States Patent
Kim et al.

(10) Patent No.: US 10,418,655 B2
(45) Date of Patent: Sep. 17, 2019

(54) CATHODE CATALYST LAYER FOR FUEL CELLS, METHOD OF MANUFACTURING THE SAME AND MEMBRANE-ELECTRODE ASSEMBLY FOR FUEL CELLS INCLUDING THE SAME

(71) Applicant: KOLON INDUSTRIES, INC., Gwacheon-si, Gyeonggi-do (KR)

(72) Inventors: Yeon Su Kim, Yongin-si (KR); Tae Yoon Kim, Yongin-si (KR); Dae Jong You, Yongin-si (KR); Hong Chul Jang, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 2 days.

(21) Appl. No.: 15/534,108

(22) PCT Filed: May 25, 2016

(86) PCT No.: PCT/KR2016/005530
§ 371 (c)(1),
(2) Date: Jun. 8, 2017

(87) PCT Pub. No.: WO2016/195313
PCT Pub. Date: Dec. 8, 2016

(65) Prior Publication Data
US 2017/0346120 A1 Nov. 30, 2017

(30) Foreign Application Priority Data
May 29, 2015 (KR) .................. 10-2015-0076585

(51) Int. Cl.
*H01M 4/88* (2006.01)
*H01M 4/90* (2006.01)
(Continued)

(52) U.S. Cl.
CPC ....... *H01M 8/1018* (2013.01); *H01M 4/8605* (2013.01); *H01M 4/88* (2013.01);
(Continued)

(58) Field of Classification Search
CPC .... H01M 4/8605; H01M 4/88; H01M 4/8817; H01M 4/8825; H01M 4/90; H01M 4/926; H01M 8/1004; H01M 8/1018
See application file for complete search history.

(56) References Cited

U.S. PATENT DOCUMENTS

2007/0116624 A1 5/2007 Joo et al.
2008/0160391 A1 7/2008 Joo et al.
(Continued)

FOREIGN PATENT DOCUMENTS

JP 2004071253 A 3/2004
JP 2007137755 A 6/2007
(Continued)

OTHER PUBLICATIONS

English translation of KR Publication 10-2012-0061484, Jun. 2012.*
(Continued)

*Primary Examiner* — Brittany L Raymond
(74) *Attorney, Agent, or Firm* — Sughrue Mion, PLLC (57) ABSTRACT

Disclosed is a cathode catalyst layer for fuel cells including heat-treated ordered mesoporous carbon, wherein the heat-treated ordered mesoporous carbon is present in an amount of 1% by weight to 15% by weight, with respect to the total weight of the cathode catalyst layer for fuel cells, and a method of manufacturing the same.

17 Claims, 6 Drawing Sheets

(51) Int. Cl.
    *H01M 8/1004*     (2016.01)
    *H01M 8/1018*     (2016.01)
    *H01M 4/86*     (2006.01)
    *H01M 4/92*     (2006.01)

(52) U.S. Cl.
    CPC ....... *H01M 4/8817* (2013.01); *H01M 4/8825* (2013.01); *H01M 4/90* (2013.01); *H01M 4/926* (2013.01); *H01M 8/1004* (2013.01); *Y02P 70/56* (2015.11)

(56) References Cited

U.S. PATENT DOCUMENTS

| | | | | |
|---|---|---|---|---|
| 2011/0159403 | A1* | 6/2011 | Karulkar | H01M 4/861 429/487 |
| 2013/0337365 | A1* | 12/2013 | Pak | H01M 4/9083 429/482 |
| 2014/0080011 | A1 | 3/2014 | Kim et al. | |
| 2014/0099553 | A1* | 4/2014 | Yu | H01M 4/133 429/231.8 |
| 2014/0329085 | A1 | 11/2014 | Kim et al. | |
| 2015/0207152 | A1* | 7/2015 | Kim | H01M 4/926 429/485 |
| 2015/0214554 | A1* | 7/2015 | Kaneda | H01M 4/9041 429/484 |

FOREIGN PATENT DOCUMENTS

| | | | |
|---|---|---|---|
| KR | 10-0574030 B1 | | 4/2006 |
| KR | 10-2012-0061484 | * | 6/2012 |
| KR | 10-2012-0061484 A | | 6/2012 |
| KR | 10-1264147 B1 | | 5/2013 |
| KR | 10-2013-0142242 A | | 12/2013 |
| KR | 10-1390036 B1 | | 4/2014 |

OTHER PUBLICATIONS

International Search Report of PCT/KR2016/005530 dated Aug. 8, 2016.

European Patent Office; Communication dated Mar. 29, 2018, in counterpart European Application No. 16803668.9.

European Patent Office, Communication dated Jul. 17, 2018, issued in corresponding European Application No. 16803668.9.

Norihiro Suzuki et al, "Synthesis of Functional Mesoporous (Nanoporous) Materials", Oreo science, 2013, vol. 13, No. 8, pp. 29-36 (9 total).

Japanese Patent Office ;Communication dated Jun. 5, 2018 in counterpart Japanese application No. 2017-530700.

* cited by examiner

CATHODE CATALYST LAYER FOR FUEL CELLS, METHOD OF MANUFACTURING THE SAME AND MEMBRANE-ELECTRODE ASSEMBLY FOR FUEL CELLS INCLUDING THE SAME

CROSS REFERENCE TO RELATED APPLICATIONS

This application is a National Stage of International Application No. PCT/KR2016/005530 filed May 25, 2016, claiming priority based on Korean Patent Application No. 10-2015-0076585 filed May 29, 2015, the contents of all of which are incorporated herein by reference in their entirety.

TECHNICAL FIELD

The present invention relates to a cathode catalyst layer for fuel cells, a method of manufacturing the same and a membrane-electrode assembly including the same.

BACKGROUND ART

A fuel cell is an electric power generating system for directly converting chemical reaction energy of oxygen and hydrogen contained in a hydrocarbon-based material such as methanol, ethanol, or natural gas, into electrical energy.

Such a fuel cell is a clean energy source which can replace fossil energy, which has an advantage of providing a variety of range of power based on stack configuration via lamination of unit cells, and attracts much attention as a small portable power supply owing to 4 to 10-times higher energy density than small lithium batteries.

Representative examples of fuel cells include polymer electrolyte membrane fuel cells (PEMFCs) and direct oxidation fuel cells. A direct methanol fuel cell (DMFC) refers to a type of direct oxidation fuel cell which uses methanol as a fuel.

The polymer electrolyte membrane fuel cell has advantages of high energy density and high power, but has disadvantages of requiring care in handling hydrogen gas and additional facilities such as fuel modification devices for modifying methane, methanol, natural gas or the like in order to produce hydrogen as a fuel gas.

On the other hand, the direct oxidation fuel cell has lower energy density than the polymer electrolyte membrane fuel cell, but has advantages of easy handling of fuels, operation availability at a low operation temperature such as room temperature and in particular, and no need for fuel modification devices.

In such a fuel cell system, the stack actually generating electricity has a structure in which several to several dozen unit cells, each consisting of a membrane-electrode assembly (MEA) and a separator (also called a "bipolar plate"), are laminated. The membrane-electrode assembly has a structure in which a polymer electrolyte membrane including a hydrogen ion conducting polymer is interposed between an anode (also called a "fuel electrode" or "oxidation electrode") and a cathode (also called an "air electrode" or "reduction electrode").

Electricity is generated by a fuel cell based on the following principle. A fuel is supplied to a fuel electrode, i.e., the anode, is adsorbed on a catalyst of the anode, and is then oxidized to produce a hydrogen ion and an electron. The generated electron moves to an oxidation electrode, i.e., a cathode via an exterior circuit, while the hydrogen ion passes through the polymer electrolyte membrane and then moves to the cathode. An oxidizing agent is supplied to the cathode, the oxidizing agent, the hydrogen ion and electron react with one another on the catalyst of the cathode to produce water and, at the same time, generate electricity.

Research to improve activity of catalysts is actively underway because the performance of the fuel cell is greatly affected by the performance of catalysts of the anode and cathode.

In particular, the polymer electrolyte membrane fuel cell is commercially available and practically applicable earlier than other fuel cells due to the advantage of providing high-efficiency high power at low operation temperature.

Cost reduction via reduction of the amount of platinum used is the most potential issue in order to commercialize polymer electrolyte membrane fuel cells. However, reduction in amount of platinum used can have adverse influences on both power and durability.

Generally, a Pt/C catalyst wherein nano-scale Pt is supported on carbon having a high specific surface area is most commonly used, but there is a problem of decrease in durability caused by deterioration of the catalyst.

Therefore, research is continuing to design structures of catalyst layers capable of solving problems associated with performance and durability resulting from decreased platinum content.

DISCLOSURE

Technical Problem

Therefore, the present invention has been made in view of the above problems, and it is one object of the present invention to provide a cathode catalyst layer for fuel cells with excellent durability and power performance as well as superior economic efficiency.

It is another object of the present invention to provide a method of manufacturing a cathode catalyst layer for fuel cells.

It is yet another object of the present invention to provide a membrane-electrode assembly including the cathode catalyst layer for fuel cells.

Technical Solution

In accordance with the present invention, the above and other objects can be accomplished by the provision of a cathode catalyst layer for fuel cells including heat-treated ordered mesoporous carbon, wherein the heat-treated ordered mesoporous carbon is present in an amount of 1% by weight to 15% by weight, with respect to the total weight of the cathode catalyst layer for fuel cells.

The heat treatment may be carried out at 900° C. to 3000° C. for 30 minutes to 3 hours.

The heat-treated ordered mesoporous carbon may include pores having a mean diameter of 3 nm to 10 nm.

The heat-treated ordered mesoporous carbon may have a hydrophobic surface.

The heat-treated ordered mesoporous carbon may take the shape of a nanorod.

The nanorod may have a length of 500 nm to 1000 nm.

A total pore diameter in the cathode catalyst layer for fuel cells may be 40 nm to 120 nm.

The cathode catalyst layer for fuel cells may further include Co, Ru, or a combination thereof.

In another aspect of the present invention, provided is a method of manufacturing a cathode catalyst layer for fuel cells including heat-treating ordered mesoporous carbon containing a hydrophilic group, dispersing the heat-treated ordered mesoporous carbon with an ionomer in an organic solvent to prepare a composition, and coating a support film with the composition and drying the support film.

The heat treatment has been described above.

The dispersion may be carried out using a 3-roll mill.

The ionomer may be a sulfonated highly fluorinated polymer.

The support film may include a polyethylene film, a Mylar film, a polyethylene terephthalate film, a Teflon film, a polyimide film or a combination thereof.

The heat-treated ordered mesoporous carbon may take the shape of a nanorod.

The nanorod has been described above.

The heat-treated ordered mesoporous carbon may be present in an amount of 1% by weight to 15% by weight, with respect to the total weight of the cathode catalyst layer for fuel cells.

In yet another aspect of the present invention, provided is a membrane-electrode assembly for fuel cells including the cathode catalyst layer for fuel cells.

The fuel cell may be a polymer electrolyte membrane fuel cell (PEMFC).

Effects of the Invention

The cathode catalyst layer for fuel cells exhibits excellent durability, power performance and economic efficiency.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, embodiments of the present invention will be described in more detail such that a person having ordinary knowledge in the field to which the present invention pertains can easily implement the embodiments. However, the embodiments of the present invention can be implemented in various forms and should not be construed as being limited to the embodiments described herein.

This application claims the benefit of Korean Patent Application No. 10-2015-0076585 filed on May 29, 2015 with the Korean Intellectual Property Office, the disclosure of which is herein incorporated by reference in its entirety.

In the drawings, the thicknesses of layers and regions are exaggerated for better understanding of the present invention.

It will be understood that when an element such as a layer, film, region or substrate is referred to as being "on" another element, it can be directly on the other element or intervening elements may also be present. In contrast, when an element is referred to as being "directly on" another element, there are no intervening elements present.

As used herein, the expression "a combination thereof" means an alloy, mixture or laminate thereof.

An embodiment provides a cathode catalyst layer for fuel cells including heat-treated ordered mesoporous carbon, wherein the heat-treated ordered mesoporous carbon is present in an amount of 1% by weight to 15% by weight, with respect to the total weight of the cathode catalyst layer for fuel cells.

The cathode catalyst layer for fuel cells includes the heat-treated ordered mesoporous carbon, thereby exhibiting excellent structural stability and reducing mass transfer resistance and charge transfer resistance to greatly improve durability and power performance of the membrane-electrode assembly including the cathode catalyst layer for fuel cells.

In addition, the heat-treated ordered mesoporous carbon is present in an amount of 1% by weight to 15% by weight, with respect to the total weight of the cathode catalyst layer for fuel cells. By including the heat-treated ordered mesoporous carbon in an amount within the range defined above, pore volume can be controlled. For this reason, power performance can be improved. That is, when the content is within the range, pore volume and pore particle size are increased, gas transfer routes can be sufficiently secured and high power characteristics can thus be accomplished. However, when the heat-treated ordered mesoporous carbon is present in an amount of less than 1% by weight, with respect to the total weight of the cathode catalyst layer for fuel cells, gas transfer routes cannot be sufficiently secured and when the heat-treated ordered mesoporous carbon is present in an amount exceeding 15% by weight, with respect to the total weight of the cathode catalyst layer for fuel cells, durability is disadvantageously deteriorated.

The heat treatment may be carried out at 900° C. to 3000° C. for 30 minutes to 3 hours. When the ordered mesoporous carbon is heat-treated under these conditions, the ordered mesoporous carbon is surface-modified. That is, the ordered mesoporous carbon has hydrophilic groups such as hydroxyl groups on the surface thereof. Through the heat-treatment, the surface of the ordered mesoporous carbon becomes hydrophobic. For this reason, dispersibility of the ordered mesoporous carbon in an organic solvent or the like can be improved. That is, by heat-treating ordered mesoporous carbon within the above temperature range, hydrophilicity and hydrophobicity of the surface of the ordered mesoporous carbon can be controlled so that dispersibility in an organic solvent or the like can be improved. In addition, ultimately, the membrane-electrode assembly including a cathode catalyst layer according to an embodiment can accomplish high durability under high-humidity conditions.

The heat-treated ordered mesoporous carbon may include pores having a mean diameter of 3 nm to 10 nm, for example, 3 nm to 5 nm. For example, the mean diameter of pores is 3.5 nm, but the present invention is not limited thereto. In addition, the cathode catalyst layer for fuel cells may have a total pore diameter of 40 nm to 120 nm. When the pores have a mean diameter within the range defined above and the total pore diameter is within the range, gas transfer route is sufficiently secured and electrochemical activity such as high power can be improved.

The heat-treated ordered mesoporous carbon may take the shape of a nanorod. In this case, mass transfer of gas can be facilitated.

The nanorod may have a length of 500 nm to 1000 nm. In this case, the nanorod can have a wide surface area without agglomeration between particles.

The cathode catalyst layer for fuel cells may further include Co, Ru or a combination thereof, but the present invention is not limited thereto.

A method of manufacturing the cathode catalyst layer for fuel cells having the configuration according to an embodiment includes: heat-treating ordered mesoporous carbon containing a hydrophilic group; dispersing the heat-treated ordered mesoporous carbon with an ionomer in an organic solvent to prepare a composition; and coating a support film with the composition and drying the support film.

The heat treatment has been described above.

The dispersion may be carried out using a 3-roll mill. The ordered mesoporous carbon tends to agglomerate and is thus difficult to disperse when mixed with other catalysts or the like in a solvent. Accordingly, ordered mesoporous carbon containing a hydrophilic group, such as a hydroxyl group, is heat-treated. In addition to the heat treatment, a 3-roll mill is used to disperse the heat-treated ordered mesoporous carbon with an ionomer in a small amount of organic solvent (such as water and alcohol or the like).

A representative example of the ionomer is sulfonated highly fluorinated polymer (for example, Nafion: DuPont™) which has a main chain containing fluorinated alkylene and a side chain containing fluorinated vinyl ether having a sulfonic acid group at an end thereof and all polymers having similar properties thereto can be used.

The support film may include a polyethylene film, a Mylar film, a polyethylene terephthalate film, a Teflon film, a polyimide film or a combination thereof.

The heat-treated ordered mesoporous carbon may take the shape of a nanorod. In this case, the effect of facilitating mass transfer of gas can be achieved.

The nanorod may have a length of 500 nm to 1000 nm. In this case, the nanorod can have a wide surface area without agglomeration between particles.

The heat-treated ordered mesoporous carbon may be present in an amount of 1% by weight to 15% by weight, with respect to the total weight of the cathode catalyst layer for fuel cells. By including the heat-treated ordered mesoporous carbon present in the amount within the range defined above, pore volume can be controlled and power performance can thus be improved. That is, when the content is within the range, pore volume and pore particle size are increased, gas transfer route is sufficiently secured and high power characteristics can thus be accomplished.

Another embodiment provides a membrane-electrode assembly for fuel cells including the cathode catalyst layer for fuel cells.

The membrane-electrode assembly may further include a cathode and/or an anode. That is, the membrane-electrode assembly for fuel cells includes a cathode and an anode which face each other, and a polymer electrolyte membrane interposed between the cathode and the anode, and the cathode may further include the cathode catalyst layer for fuel cells according to the embodiment.

The polymer electrolyte membrane is generally used as a polymer electrolyte membrane for fuel cells and any polymer electrolyte membrane may be used so long as it is made of a polymer resin having the ability to conduct hydrogen ions. Representative examples include polymer resins having, at a side chain thereof, a cationic exchanger selected from the group consisting of a sulfonic acid group, a carboxylic acid group, a phosphoric acid group, a phosphonic acid group and a derivative thereof.

Representative examples of the polymer resin include at least one of fluoro-based polymers, benzimidazole-based polymers, polyimide-based polymers, polyetherimide-based polymers, polyphenylene sulfide-based polymers, polysulfone-based polymers, polyether sulfone-based polymers, polyether ketone-based polymers, polyether-ether ketone-based polymers and polyphenylquinoxaline-based polymers. Representative polymer resins include one or more selected from poly(perfluorosulfonic acid) (generally, marketed under the trademark of Nafion), poly(perfluorocarboxylic acid), and copolymers of fluorovinylether and tetrafluoroethylene including sulfonic acid groups, defluorinated polyetherketone sulfide, arylketone, poly(2,2'-(m-phenylene)-5,5'-bibenzimidazole) and poly(2,5-benzimidazole).

In addition, hydrogen (H) of the hydrogen ion conductive group of this hydrogen ion-conducting polymer can be replaced by Na, K, Li, Cs, or tetrabutylammonium. When the hydrogen (H) of the hydrogen ion conductive group of the hydrogen ion-conducting polymer is replaced by Na, in case where NaOH is replaced by tetrabutylammonium, tetrabutylammonium hydroxide is used for the replacement, and K, Li, or Cs can be also replaced by a suitable compound. This replacement method is well-known in the art and detailed description is omitted in the specification. In addition, after replacement by Na, K, Li, Cs, or tetrabutylammonium, catalyst layer acid-treatment is conducted so that a proton-type ($H^+$-form) polymer electrolyte membrane is obtained.

The fuel cell may be a polymer electrolyte membrane fuel cell (PEMFC).

Yet another embodiment provides a fuel cell system which includes at least one electricity generator, a fuel feeder and an oxidizing agent feeder.

The electricity generator includes the membrane-electrode assembly and a separator (also referred to as a "bipolar plate"). The electricity generator functions to generate electricity through oxidation of fuel and reduction of an oxidizing agent.

The fuel feeder functions to supply fuels to the electricity generator and the oxidizing agent feeder functions to supply an oxidizing agent such as oxygen or air to the electricity generator.

In an embodiment, the fuel may include gas or liquid hydrogen or hydrocarbon. Representative examples of the hydrocarbon include methanol, ethanol, propanol, butanol or natural gas.

Figure 6:
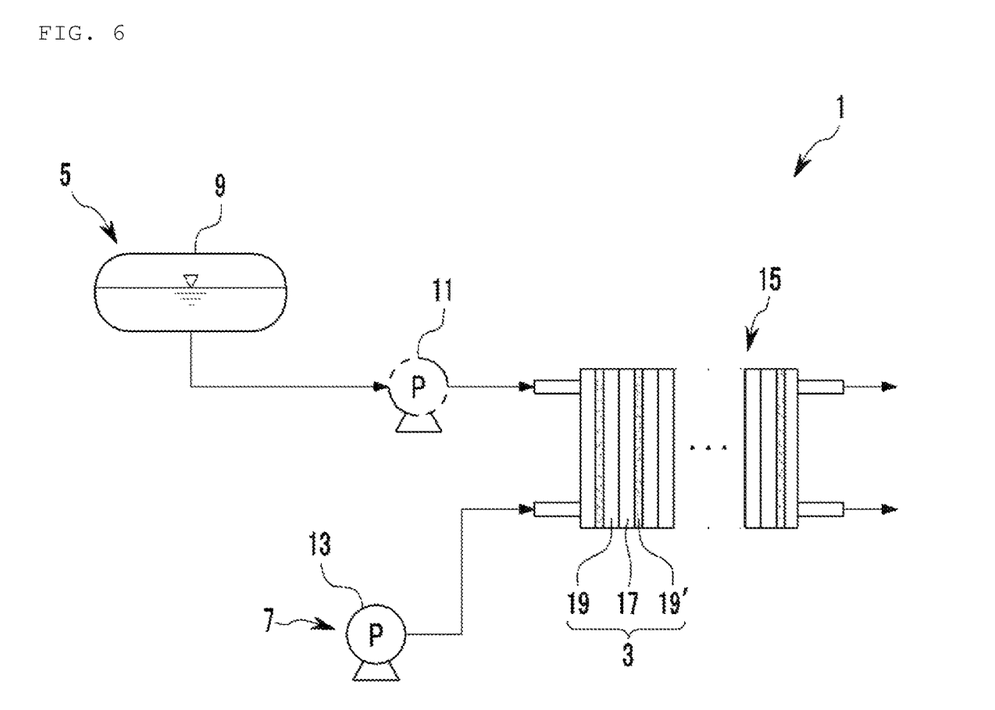
FIG. 6 is a schematic view illustrating the structure of a fuel cell system.

A schematic structure of the fuel cell system according to the embodiment is shown in FIG. 6. The fuel cell system will be described in more detail with reference to FIG. 6. With regard to the structure shown in FIG. 6, the system supplies fuel and an oxidizing agent using a pump to the electricity generator, but the fuel cell system is not limited to this structure and the fuel cell system using a diffusion method without using a pump may be used.

The fuel cell system 1 according to an embodiment includes at least one electricity generator 3 which generates electrical energy through oxidation of fuel and reduction of an oxidizing agent, a fuel feeder 5 for supplying the fuel, and an oxidizing agent feeder 7 for supplying an oxidizing agent to the electricity generator 3.

In addition, the fuel feeder 5 for supplying the fuel may include a fuel tank 9 for storing fuel and a fuel pump 11 connected to the fuel tank 9. The fuel pump 11 functions to discharge the stored fuel in the fuel tank 9 via a predetermined pumping power.

The oxidizing agent feeder 7 for supplying the oxidizing agent to the electricity generator 3 includes at least one oxidizing agent pump 13 for absorbing the oxidizing agent via a predetermined pumping power.

The electricity generator 3 includes a membrane-electrode assembly 17 for oxidizing and reducing fuel and an oxidizing agent, and separators 19 and 19' for supplying fuel and the oxidizing agent to both sides of the membrane-electrode assembly 17, and one or more electricity generators including such electricity generator 3 are joined to form a stack 15.

[Mode for the Invention]

Now, the present invention will be described in more detail with reference to preferred examples and comparative examples. However, these examples are provided only for illustrative purpose and should not be construed as limiting the scope of the present invention.

EXAMPLE

Example 1

Production of Cathode Catalyst Layer Including Ordered Mesoporous Carbon (OMC)

A solvent consisting of ultra-pure water and an organic solvent was prepared. A catalyst, a thickening agent and an ionomer (for example, Nafion produced by DuPont or the like) were added to the prepared solvent, and ordered mesoporous carbon (OMC) which had been surface-modified by heat treatment at 1500° C. to 2000° C. for 1 to 2 hours was added thereto. Then, the resulting material was dispersed by mixing using a 3-roll mill to prepare a slurry. The prepared slurry was coated to produce a cathode catalyst layer.

Comparative Example 1

Production of Cathode Catalyst Layer Not Including Ordered Mesoporous Carbon (OMC)

A solvent consisting of ultra-pure water and an organic solvent was prepared. A catalyst, a thickening agent and an ionomer (for example, Nafion produced by DuPont, or the like) were added to the prepared solvent. Then, the material was dispersed by mixing using a 3-roll mill to prepare a slurry. The prepared slurry was coated to produce a cathode catalyst layer.

Test 1: Dispersibility

Transmission electron microscope (TEM) and scanning electron microscope (SEM) images of the cathode catalyst layers according to Example 1 and Comparative Example 1 were obtained and dispersibility of ordered mesoporous carbon was measured.

Figure 1:
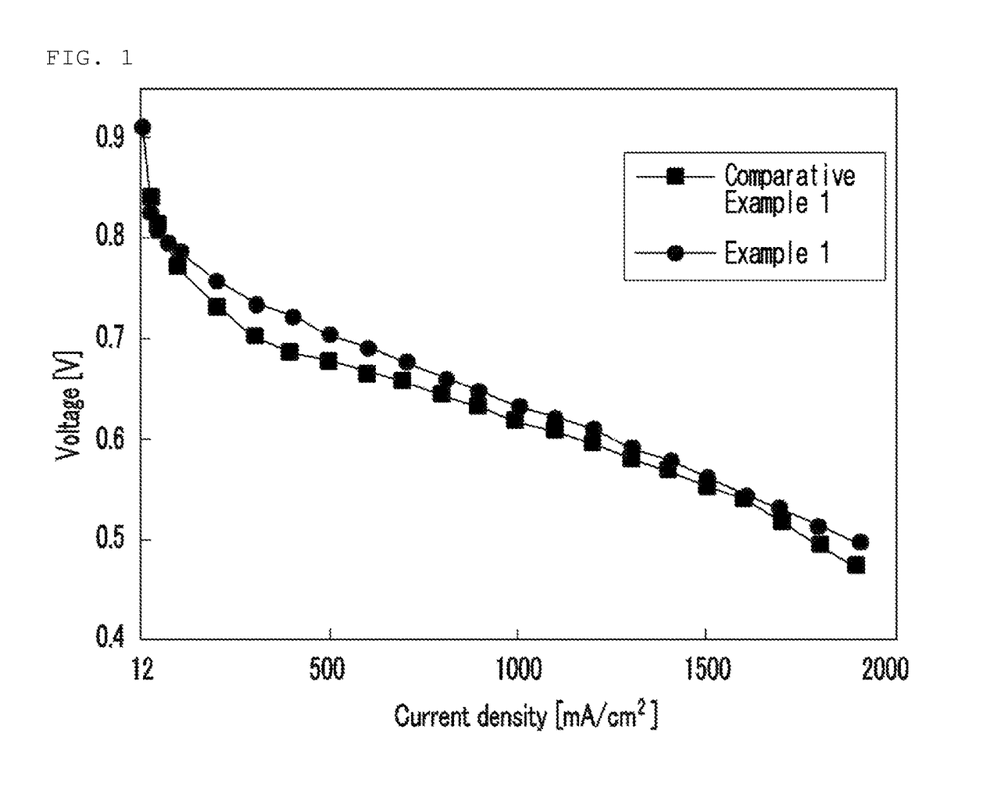
FIG. 1 is a current-voltage graph of membrane-electrode assemblies according to Example 1 and Comparative Example 1.
Figure 2:
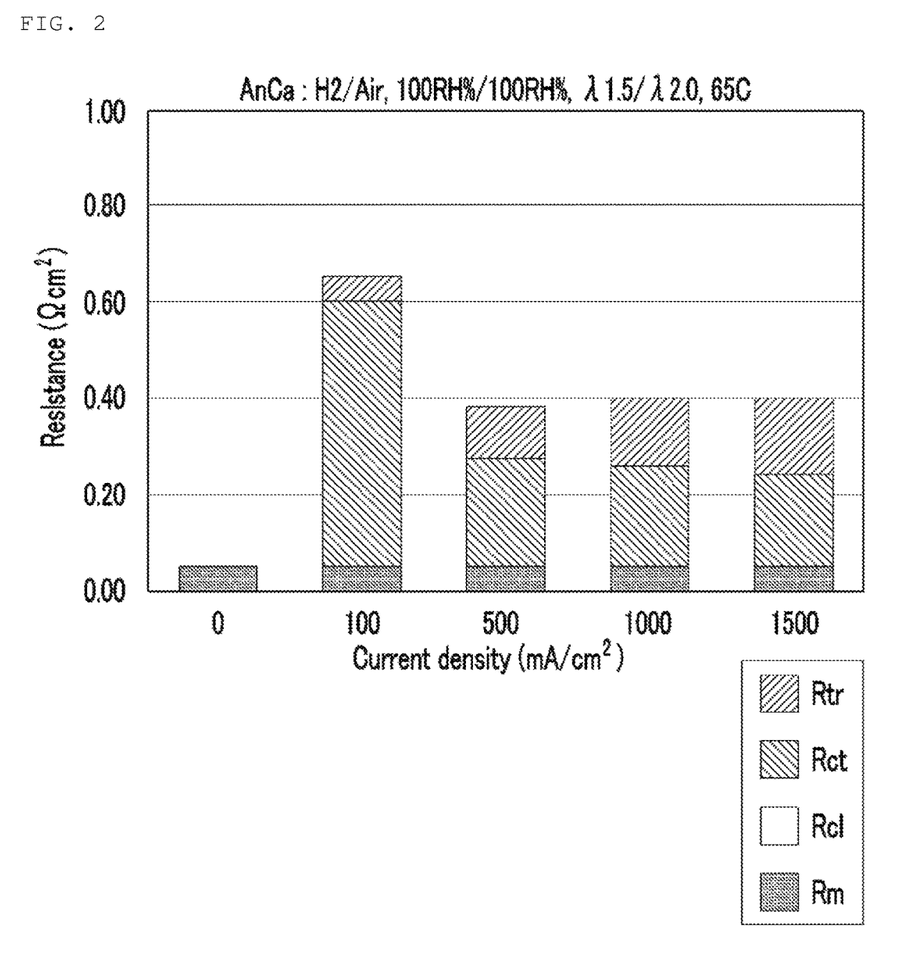
FIGS. 2 and 3 are graphs showing electrochemical impedance spectroscopy (EIS) analysis results for cathode catalyst layers of membrane-electrode assemblies according to Example 1 and Comparative Example 1, respectively, and in FIGS. 2 and 3, $R_{cl}$ represents resistance applied to the catalyst layer (interface resistance between the catalyst layer and a layer (membrane) adjacent thereto), $R_m$ represents membrane resistance, $R_{tr}$ represents mass transfer resistance, and $R_{ct}$ represents charge transfer resistance.

The transmission electron microscope (TEM) image of ordered mesoporous carbon in the cathode catalyst layer for fuel cells is shown in FIG. 1 of Korean Patent Application No.10-2015-0076585, and the scanning electron microscope (SEM) image is shown in FIG. 2 of Korean Patent Application No. 10-2015-0076585.

As can be seen from the TEM image shown in FIG. 1 of Korean Patent Application No. 10-2015-0076585 and the SEM image shown in FIG. 2 of Korean Patent Application No. 10-2015-0076585, cathode catalyst layers with excellent dispersibility were produced. In addition, the mean particle size of pores was found to be 3.5 nm.

Test 2: Power and Resistance Characteristics

Figure 3:
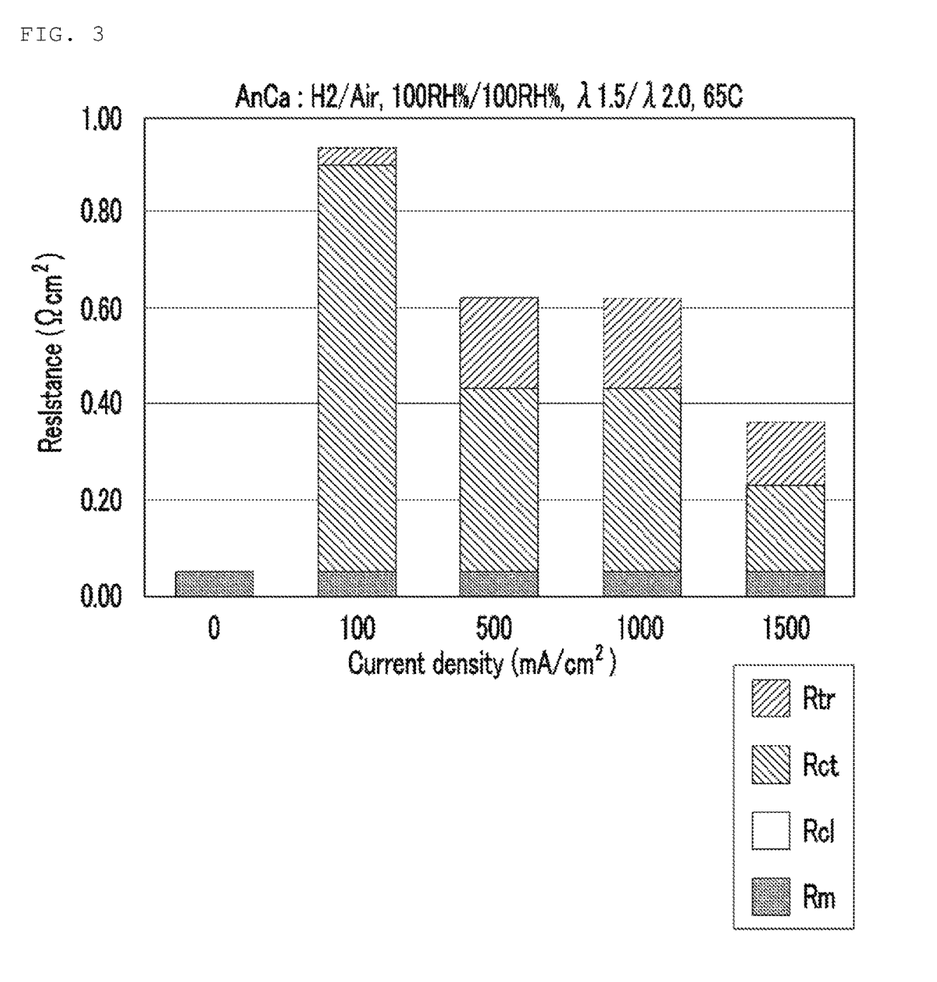

The power and resistance characteristics of membrane-electrode assemblies including cathode catalyst layers according to Example 1 and Comparative Example 1 were measured and results are shown in FIGS. 1 to 3.

As can be seen from FIG. 1, the membrane-electrode assembly including a cathode catalyst layer including ordered mesoporous carbon exhibited better power characteristics, as compared to the membrane-electrode assembly including a cathode catalyst layer not including ordered mesoporous carbon. In addition, as can be seen from FIGS. 2 and 3, the membrane-electrode assembly including a cathode catalyst layer including ordered mesoporous carbon had lower resistance than the membrane-electrode assembly including a cathode catalyst layer not including ordered mesoporous carbon.

Test 3: Pore characteristics

Figure 4:
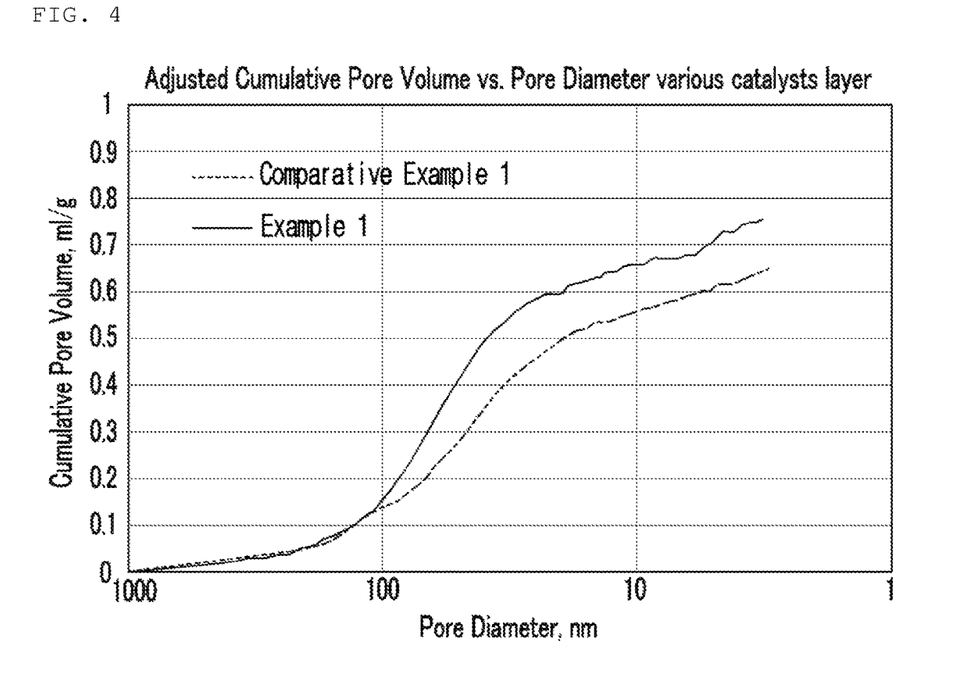
FIGS. 4 and 5 are graphs comparatively showing pore volume and pore size between cathode catalyst layers in membrane-electrode assemblies according to Example 1 and Comparative Example 1.
Figure 5:
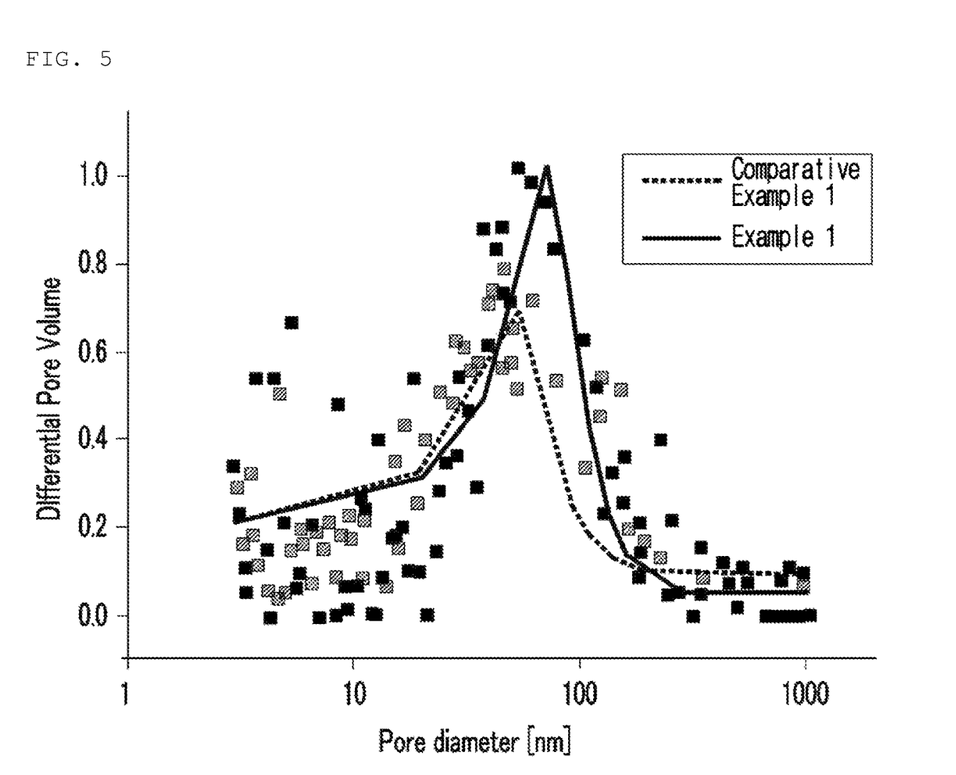

The pore volume and pore diameter in the cathode catalyst layer according to Example 1 and Comparative Example 1 were tested and results are shown in FIGS. 4 and 5.

As can be seen from FIGS. 4 and 5, the membrane-electrode assembly including a cathode catalyst layer including ordered mesoporous carbon had effective gas channels due to increased overall pore volume and pore diameter, and thus reduced mass transfer resistance, as compared to the membrane-electrode assembly including a cathode catalyst layer not including ordered mesoporous carbon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a cathode catalyst layer for fuel cells, a method of manufacturing the same and a membrane-electrode assembly including the same. The present invention relates to a cathode catalyst layer for fuel cells including heat-treated ordered mesoporous carbon wherein the heat-treated ordered mesoporous carbon is present in an amount of 1% by weight to 15% by weight, with respect to the total weight of the cathode catalyst layer for fuel cells, and a method of manufacturing the same. The cathode catalyst layer for fuel cells exhibits excellent durability, power performance and economic efficiency.

The invention claimed is:

1. A cathode catalyst layer for fuel cells comprising heat-treated ordered mesoporous carbon,
   wherein the heat-treated ordered mesoporous carbon is present in an amount of 1% by weight to 15% by weight, with respect to the total weight of the cathode catalyst layer for fuel cells,
   wherein the heat-treated ordered mesoporous carbon is formed by heat-treating ordered mesoporous carbon containing a hydroxyl group, and
   wherein the surface of the ordered mesoporous carbon becomes hydrophobic through the heat-treatment.

2. The cathode catalyst layer according to claim 1, wherein the heat treatment is carried out at 900° C. to 3000° C. for 30 minutes to 3 hours.

3. The cathode catalyst layer according to claim 1, wherein the heat-treated ordered mesoporous carbon comprises pores having a mean diameter of 3 nm to 10 nm.

4. The cathode catalyst layer according to claim 1, wherein the heat-treated ordered mesoporous carbon has a hydrophobic surface.

5. The cathode catalyst layer according to claim 1, wherein the heat-treated ordered mesoporous carbon is nanorod-shaped.

6. The cathode catalyst layer according to claim 5, wherein the nanorod has a length of 500 nm to 1000 nm.

7. The cathode catalyst layer according to claim 1, wherein a total pore diameter in the cathode catalyst layer for fuel cells is 40 nm to 120 nm.

8. The cathode catalyst layer according to claim 1, wherein the cathode catalyst layer for fuel cells further comprises Co, Ru, or a combination thereof.

9. A method of manufacturing a cathode catalyst layer for fuel cells comprising:
   (a) heat-treating ordered mesoporous carbon (OMC) containing a hydrophilic group at 900° C. to 3000° C. for 30 minutes to 3 hours to obtain a heat-treated OMC, said heat-treated OMC having a hydrophobic surface;
   (b) dispersing the heat-treated OMC with hydrophobic surface obtained in (a) and an ionomer in an organic solvent in presence of a catalyst to prepare a catalyst composition comprising the heat-treated OMC with hydrophobic surface, the catalyst, the ionomer, and the organic solvent; and
   (c) coating a support film with the catalyst composition and drying the support film to give the cathode catalyst layer for fuel cells.

10. The method according to claim 9, wherein the dispersion is carried out using a 3-roll mill.

11. The method according to claim 9, wherein the ionomer of (b) is a sulfonated highly fluorinated polymer.

12. The method according to claim 9, wherein the support film of (c) comprises a polyethylene film, a Mylar film, a polyethylene terephthalate film, a Teflon film, a polyimide film or a combination thereof.

13. The method according to claim 9, wherein the heat-treated OMC with hydrophobic surface obtained in (a) is nanorod shaped.

14. The method according to claim 13, wherein the nanorod has a length of 500 nm to 1000 nm.

15. The method according to claim 9, wherein, in the cathode catalyst layer for fuel cells obtained in (c), the heat-treated OMC is present in an amount of 1% by weight to 15% by weight, with respect to the total weight of the cathode catalyst layer for fuel cells.

16. A membrane-electrode assembly for fuel cells comprising the cathode catalyst layer for fuel cells according to claim 1.

17. The membrane-electrode assembly according to claim 16, wherein the fuel cell is a polymer electrolyte membrane fuel cell (PEMFC).

* * * * *